US 6,626,253 B2

(12) United States Patent  
Hahn et al.

(10) Patent No.: US 6,626,253 B2
(45) Date of Patent: Sep. 30, 2003

(54) OSCILLATING SHEAR VALVE FOR MUD PULSE TELEMETRY

(75) Inventors: Detlef Hahn, Hannover (DE); Volker Peters, Wienhausen (DE); Cedric Rouatbi, Celle (DE)

(73) Assignee: Baker Hughes Incorporated, Houston, TX (US)

(*) Notice: Subject to any disclaimer, the term of this patent is extended or adjusted under 35 U.S.C. 154(b) by 37 days.

(21) Appl. No.: 09/794,964

(22) Filed: Feb. 27, 2001

(65) Prior Publication Data

US 2002/0117306 A1 Aug. 29, 2002

(51) Int. Cl.[7] .............................. E21B 7/04; C09K 7/00
(52) U.S. Cl. ............................... 175/48; 175/56; 367/84
(58) Field of Search .............................. 175/40, 48, 56; 367/83, 84

(56) References Cited

U.S. PATENT DOCUMENTS

| | | | |
|---|---|---|---|
| 3,764,968 A | 10/1973 | Anderson | 340/18 NC |
| 3,958,217 A | 5/1976 | Spinnler | 340/18 LD |
| 3,982,224 A | 9/1976 | Patton | 340/18 |
| RE30,055 E | * 7/1979 | Claycomb | |
| 4,166,979 A | 9/1979 | Waggener | 325/321 |
| 4,351,037 A | 9/1982 | Scherbatskoy | 367/85 |
| 4,630,244 A | 12/1986 | Larronde | 367/84 |
| 4,675,852 A | * 6/1987 | Russell et al. | |
| 4,686,658 A | 8/1987 | Davison | 367/85 |
| 4,703,461 A | 10/1987 | Kotlyar | 367/83 |
| 4,771,408 A | 9/1988 | Kotlyar | 367/83 |
| 4,785,300 A | * 11/1988 | Chin et al. | |
| 4,890,682 A | * 1/1990 | Worrall et al. | |
| 4,953,595 A | 9/1990 | Kotlyar | 137/624.13 |
| 4,956,823 A | * 9/1990 | Russell et al. | |
| 4,982,811 A | 1/1991 | Hardee | 181/106 |
| 5,119,344 A | 6/1992 | Innes | 367/84 |
| 5,182,731 A | 1/1993 | Hoelscher et al. | 367/84 |
| 5,189,645 A | 2/1993 | Innes | 367/84 |
| 5,215,152 A | * 6/1993 | Duckworth | |
| 5,249,161 A | 9/1993 | Jones et al. | 367/83 |
| 5,448,227 A | * 9/1995 | Orban et al. | |
| 5,568,448 A | * 10/1996 | Tanigushi et al. | |
| 5,963,138 A | 10/1999 | Gruenhagen | 340/679 |
| 6,089,332 A | 7/2000 | Barr et al. | 175/45 |
| 6,219,301 B1 | 4/2001 | Moriarty | 367/84 |

FOREIGN PATENT DOCUMENTS

GB 2096372 10/1982

* cited by examiner

Primary Examiner—Roger Schoeppel
(74) Attorney, Agent, or Firm—Madan, Mossman & Sriram, P.C.

(57) ABSTRACT

An anti-plugging oscillating shear valve system for generating pressure fluctuations in a flowing drilling fluid comprising a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding. The rotor is driven by a electric motor disposed in a lubricant filled housing. In one embodiment, the housing to shaft seal is a flexible bellows. In one embodiment, a torsional spring is attached to the motor and the resulting spring mass system is designed to be near resonance at the desired pulse frequency. The torsion spring may be a solid torsion bar or a magnetic spring.

22 Claims, 7 Drawing Sheets

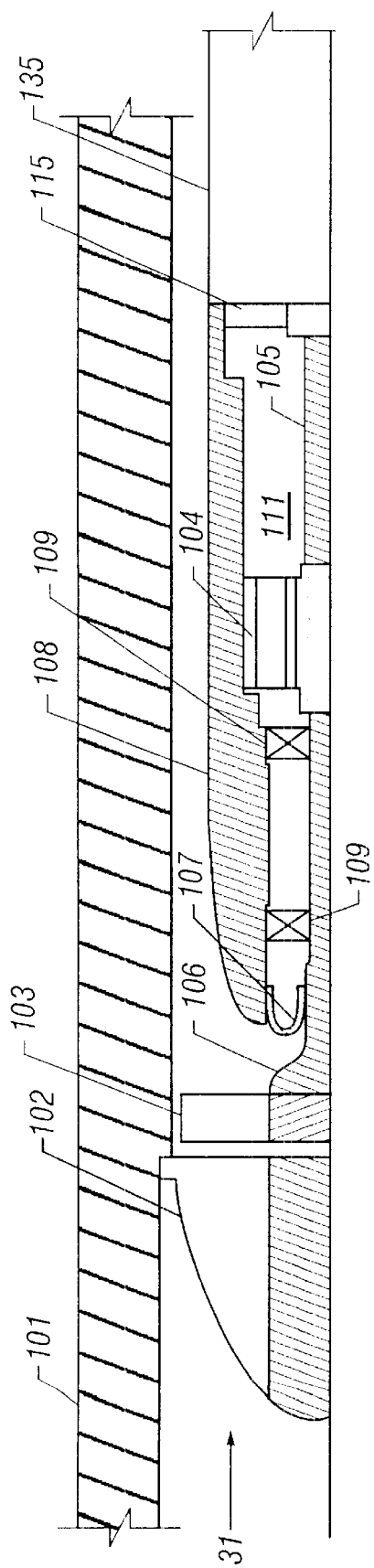
FIG. 2A
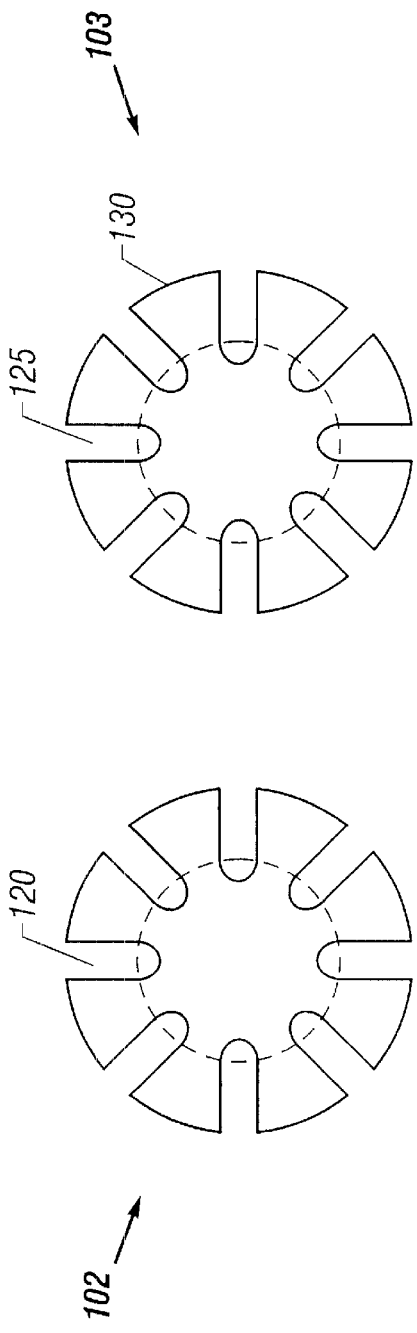
FIG. 2B
FIG. 2C

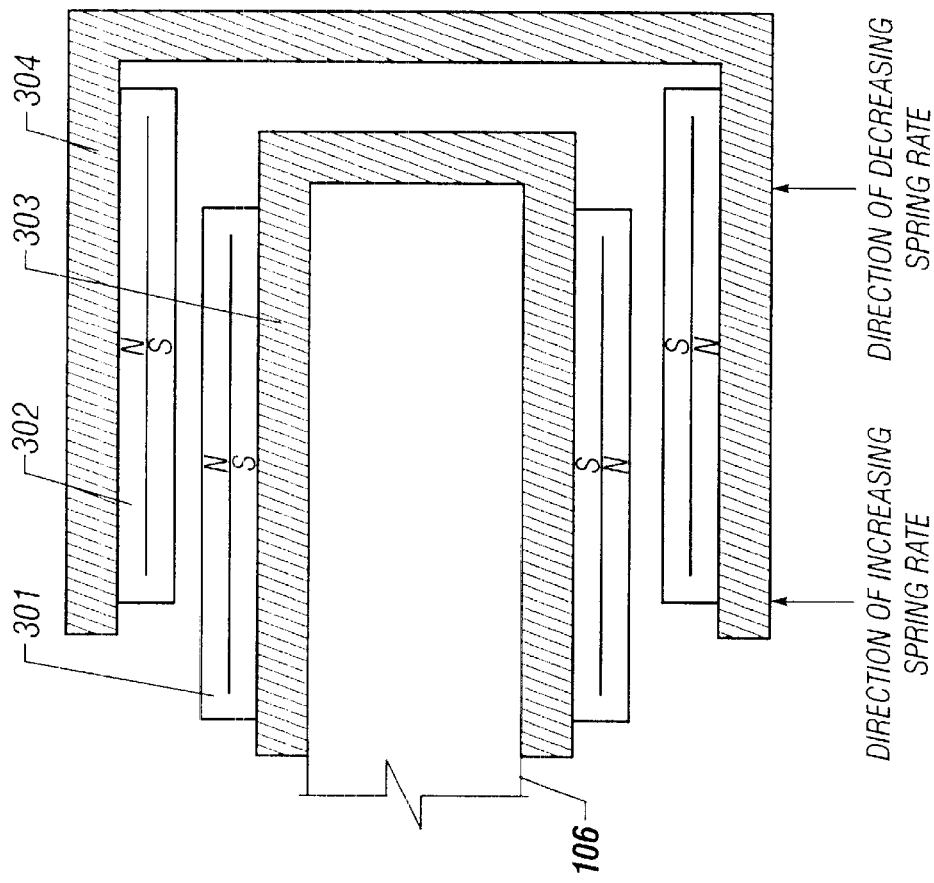
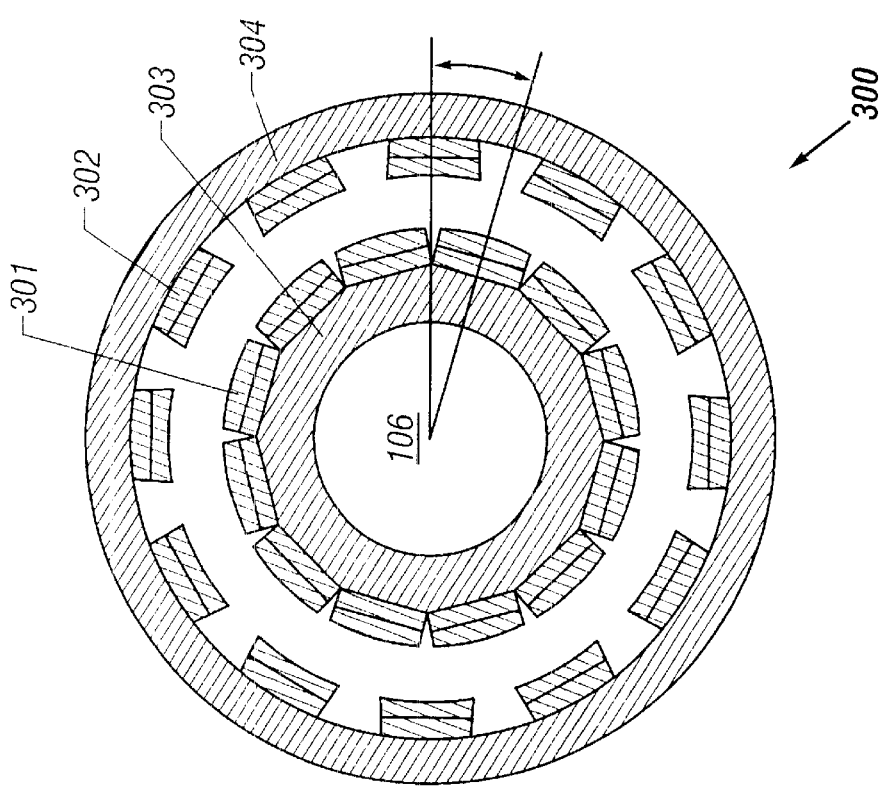

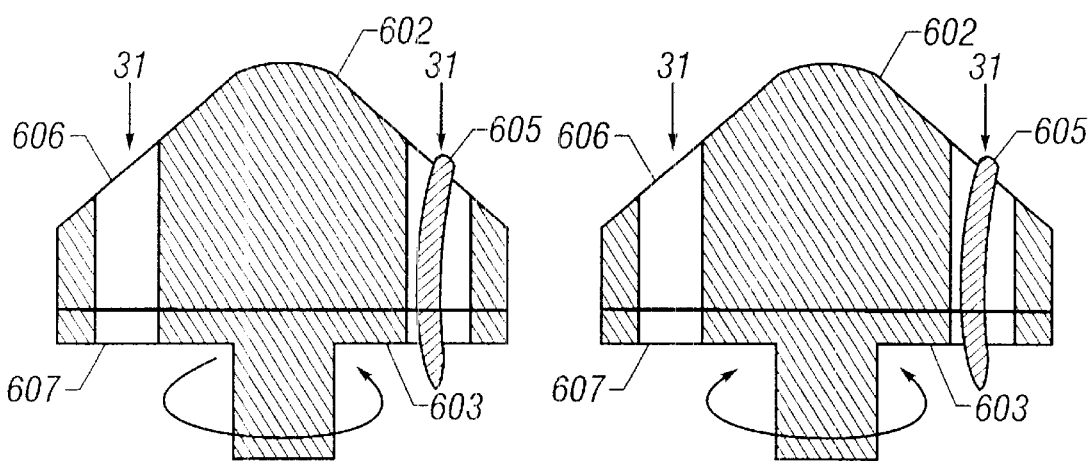
FIG. 6A  FIG. 6B
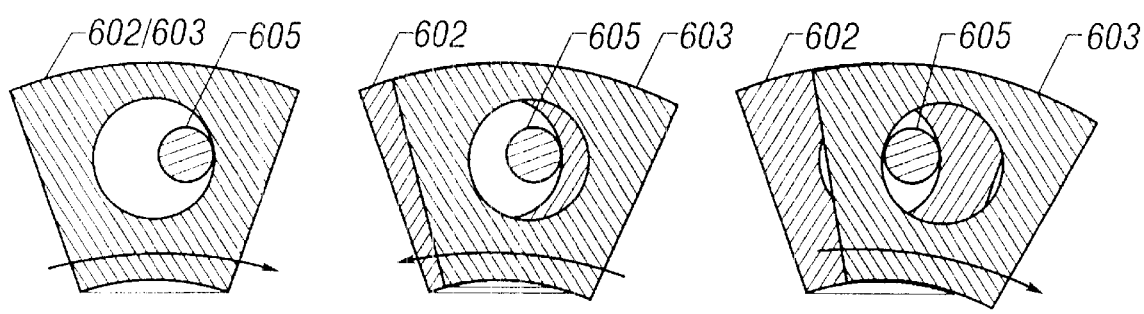
FIG. 6C-1  FIG. 6C-2  FIG. 6C-3
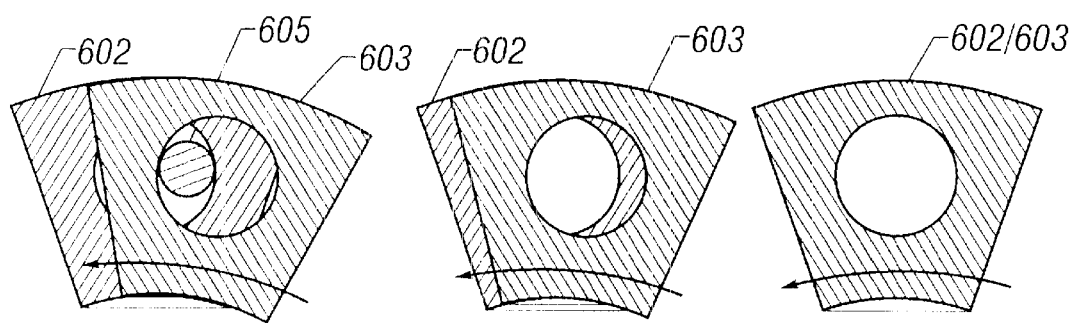
FIG. 6D-1  FIG. 6D-2  FIG. 6D-3

OSCILLATING SHEAR VALVE FOR MUD PULSE TELEMETRY

BACKGROUND OF THE INVENTION

1. Field of the Invention

The present invention relates to drilling fluid telemetry systems and, more particularly, to a telemetry system incorporating an oscillating shear valve for modulating the pressure of a drilling fluid circulating in a drill string within a well bore.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameter include logging data such as resistivity of the various layers, sonic density, porosity, induction, self potential and pressure gradients. This information is critical to efficiency in the drilling operation.

Mud pulse valves must operate under extremely high static downhole pressures, high temperatures, high flow rates and various erosive flow types. At these conditions, the valve must be able to create pressure pulses of around 100–300 psi.

Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example see U.S. Pat. No. 3,958,217.

The oil drilling industries need is to effectively increase mud pulse data transmission rates to accomodate the ever increasing amount of measured downhole data. The major disadvantage of available mud pulse valves is the low data transmission rate. Increasing the data rate with available valve types leads to unacceptably large power consumption, unacceptable pulse distortion, or may be physically impractical due to erosion, washing, and abrasive wear. Because of their low activation speed, nearly all existing mud pulse valves are only capable of generating discrete pulses. To effectively use carrier waves to send frequency shift (FSK) or phase shift (PSK) coded signals to the surface, the actuation speed must be increased and fully controlled.

Another example for a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface. By momentarily venting a portion of the fluid flow out a lateral port, an instantaneous pressure drop is produced and is detectable at the surface to provide an indication of the downhole venting. A downhole instrument is arranged to generate a signal or mechanical action upon the occurrence of a downhole detected event to produce the above described venting. The downhole valve disclosed is defined in part by a valve seat having an inlet and outlet and a valve stem movable to and away from the inlet end of the valve seat in a linear path with the drill string.

All negative pulsing valves need a certain high differential pressure below the valve to create sufficient pressure drop when the valve is open. Because of this high differential pressure, negative pulse valves are more prone to washing. In general, it is not desirable to bypass flow above the bit into the annulus. Therefore it must be ensured, that the valve is able to completely close the bypass. With each actuation, the valve hits against the valve seat. Because of this impact, negative pulsing valves are more prone to mechanical and abrasive wear than positive pulsing valves.

Positive pulsing valves might, but do not need to, fully close the flow path for operation. Positive poppet type valves are less prone to wear out the valve seat. The main forces acting on positive poppet valves are hydraulic forces, because the valves open or close axially against the flow stream. To reduce the actuation power some poppet valves are hydraulically powered as shown in U.S. Pat. No. 3,958,217. Hereby the main valve is indirectly operated by a pilot valve. The low power consumption pilot valve closes a flow restriction, which activates the main valve to create the pressure drop. The power consumption of this kind of valve is very small. The disadvantage of this valve is the passive operated main valve. With high actuation rates the passive main valve is not able to follow the active operated pilot valve. The pulse signal generated is highly distorted and hardly detectable at the surface.

Rotating disc valves open and close flow channels perpendicular to the flow stream. Hydraulic forces acting against the valve are smaller than for poppet type valves. With increasing actuation speed, dynamic forces of inertia are the main power consuming forces. U.S. Pat. No. 3,764,968 describes a rotating valve for the purpose to transmit frequency shift key (FSK) or phase shift key (PSK) coded signals. The valve uses a rotating disc and a non-rotating stator with a number of corresponding slots. The rotor is continuously driven by an electrical motor. Depending on the motor speed, a certain frequency of pressure pulses are created in the flow as the rotor intermittently interrupts the fluid flow. Motor speed changes are required to change the pressure pulse frequency to allow FSK or PSK type signals. There are several pulses per rotor revolution, corresponding to the number of slots in the rotor and stator. To change the phase or frequency requires the rotor to increase or decrease in speed. This may take a rotor revolution to overcome the rotational inertia and to achieve the new phase or frequency, thereby requiring several pulse cycles to make the transition. Amplitude coding of the signal is inherently not possible with this kind of continuously rotating device. In order to change the frequency or phase, large moments of inertia, associated with the motor, must be overcome, requiring a substantial amount of power. When continuously rotated at a certain speed, a turbine might be used or a gear might be included to reduce power consumption of the system. On the other hand, both options dramatically increase the inertia and power consumption of the system when changing form one to another speed for signal coding.

The aforesaid examples illustrate some of the critical considerations that exist in the application of a fast acting valve for generating a pressure pulse. Other considerations in the use of these systems for borehole operations involve the extreme impact forces, dynamic (vibrational) energies, existing in a moving drill string. The result is excessive wear, fatigue, and failure in operating parts of the system. The particular difficulties encountered in a drill string environment, including the requirement for a long lasting system to prevent premature malfunction and replacement of parts, require a robust and reliable valve system.

The methods and apparatus of the present invention overcome the foregoing disadvantages of the prior art by providing a novel mud pulse telemetry system utilizing a rotational oscillating shear valve.

SUMMARY OF THE INVENTION

The present invention contemplates a mud pulse telemetry system utilizing an oscillating shear valve system for generating pressure pulses in the drilling fluid circulating in a drill string in a well bore. One aspect of the invention includes a tool housing adapted to be inserted in the drill string near the bit. Mounted in the tool housing is an oscillating shear valve system comprising a non-rotating stator and a rotationally oscillating rotor, the stator and rotor having a plurality of length wise flow passages for channeling the flow. The rotor is connected to a drive shaft disposed within an lubricant filled pulser housing, and is driven by an electrical motor. A seal prevents wellbore fluid from entering the lubricant filled housing. The motor is powered and controlled by an electronics module. The rotor is powered in a rotationally oscillating motion such that the rotor flow passages are alternately aligned with the stator flow passages and then made to partially block the flow from the stator flow passages thereby generating pressure pulses in the flowing drilling fluid.

In another aspect, the invention includes a flexible elastomeric bellows seal to seal between the rotationally oscillating shaft and the lubricant filled housing.

In one embodiment, the oscillating shear valve is controlled by a processor in the electronics module according to programmed instructions.

In one embodiment, the electronics module senses pressure readings from pressure sensors mounted in the tool housing at locations above and below the pulser assembly. The processor in the electronics module acts to control the differential pressure as indicated by the sensors, according to programmed instructions.

In another embodiment, the electronics module uses the tool housing mounted pressure sensors to receive surface generated pressure command signals, and to modify the downhole encoding based on the surface generated commands.

In another embodiment, a torsional spring is attached to the motor and the end of the pulser housing, the spring being designed such that the combination of the spring and the rotating masses create a torsionally resonant spring-mass system near the desired operating frequency of the pulser. In one aspect of the invention, the torsional spring is a torsion rod type spring. In yet another aspect, the torsional spring is a magnetic spring.

In one embodiment, a method is described for generating a fast transition in a mud pulse telemetry scheme utilizing phase shift key encoding (PSK), comprising, using an oscillating shear valve to generate pressure pulses; driving the oscillating rotor at a first predetermined phase relationship, and changing the drive signal, at a predetermined rotor speed, to a second predetermined phase relationship, and attaining the second predetermined phase relationship in no more than one oscillatory period.

In another embodiment, a method is described for generating a fast transition in a mud pulse telemetry scheme utilizing frequency shift key encoding (FSK), comprising, using an oscillating shear valve to generate pressure pulses; driving the oscillating rotor at a first predetermined frequency, and changing the drive signal, at a predetermined rotor speed, to a second predetermined frequency, and attaining the second predetermined frequency in no more than one oscillatory period.

In one embodiment, a method is described for generating a fast transition in a mud pulse telemetry scheme utilizing amplitude shift key encoding (ASK), comprising, using an oscillating shear valve to generate pressure pulses, driving the oscillating rotor to a first predetermined rotational angle to generate a first signal amplitude, and changing the drive signal, at a predetermined rotor speed, to drive the rotor to a second predetermined rotational angle to generate a higher or lower pulse amplitude than the first signal amplitude.

In another embodiment, a method is described for increasing the data transmission rate of a mud pulse telemetry system by using a combination of FSK and ASK signals to transmit data, comprising, using an oscillating shear valve to generate pressure pulses; driving the oscillating rotor at a first predetermined frequency and first predetermined rotational angle, and changing the drive signal, at a predetermined rotor speed, to simultaneously change to a second predetermined frequency at a second predetermined rotational angle, and attaining the second predetermined frequency and second predetermined rotational angle in no more than one oscillatory period.

In another embodiment, a method is described for increasing the data transmission rate of a mud pulse telemetry system by using a combination of PSK and ASK signals to transmit data, comprising, using an oscillating shear valve to generate pressure pulses; driving the oscillating rotor at a first predetermined phase angle and through a first predetermined rotational angle, and changing the drive signal, at a predetermined rotor speed, to simultaneously change to a second predetermined phase angle at a second predetermined rotational angle, and attaining the second predetermined phase angle and the second predetermined rotational angle in no more than one oscillatory period.

In one embodiment, a method is described for preventing jamming of a mud pulse valve by a foreign body in a fluid stream. The method comprises utilizing an oscillating shear valve to generate pressure pulses, the oscillating shear valve comprising a non-rotating stator and an oscillating rotor, where the rotor is adapted to rotate in a first direction and a second direction, where the second direction is opposite the first direction. The oscillating action of the rotor facilitates washing out any foreign bodies lodged between the rotor and stator.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 2 is a schematic of an oscillating shear valve according to one embodiment of the present invention.

FIG. 3b is a schematic of a magnetic spring assembly according to one embodiment of the present invention.

FIG. 6a illustrates a continuously rotating shear valve.

FIG. 6b illustrates an oscillating shear valve according to one embodiment of the present invention.

FIG. 6c illustrates the jamming tendency of a continuously rotating shear valve.

FIG. 6d illustrates the anti-jamming feature of an oscillating shear valve according to one embodiment of the present invention.

DESCRIPTION OF PREFERRED EMBODIMENTS

Figure 1:
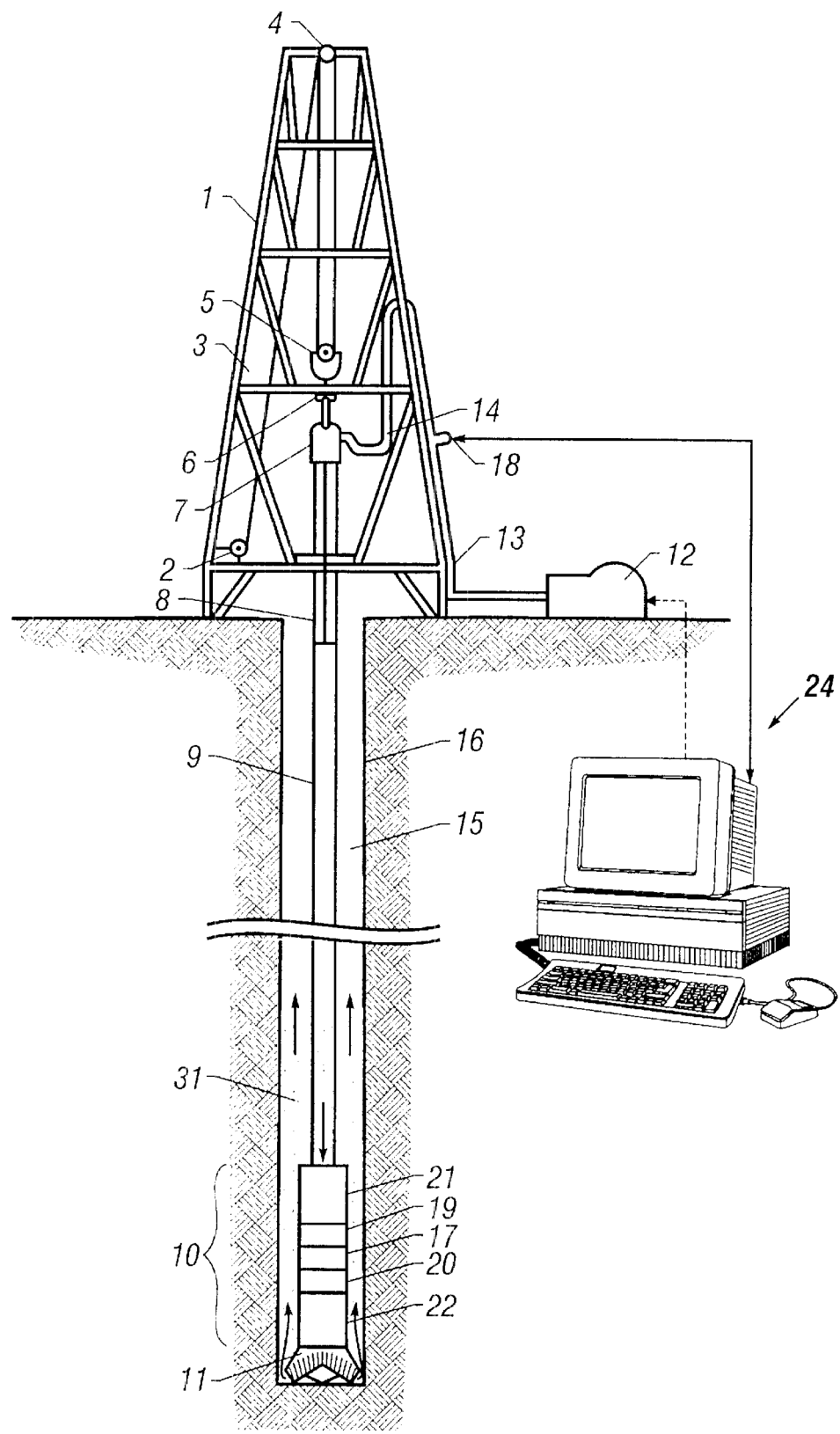
FIG. 1 is a schematic diagram showing a drilling rig 1 engaged in drilling operations.

FIG. 1 is a schematic diagram showing a drilling rig 1 engaged in drilling operations. Drilling fluid 31, also called drilling mud, is circulated by pump 12 through the drill string 9 down through the bottom hole assembly (BHA) 10, through the drill bit 11 and back to the surface through the annulus 15 between the drill string 9 and the borehole wall 16. The BHA 10 may comprise any of a number of sensor modules 17,20,22 which may include formation evaluation sensors and directional sensors. These sensors are well known in the art and are not described further. The BHA 10 also contains a pulser assembly 19 which induces pressure fluctuations in the mud flow. The pressure fluctuations, or pulses, propagate to the surface through the mud flow in the drill string 9 and are detected at the surface by a sensor 18 and a control unit 24. The sensor 18 is connected to the flow line 13 and may be a pressure transducer, or alternatively, may be a flow transducer.

FIG. 2a is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2a and 2b, is fixed with respect to the tool housing 101 and to the pulser housing 108 and has multiple lengthwise flow passages 120. The rotor 103, see FIGS. 2a and 2c, is disk shaped with notched blades 130 creating flow passages 125 similar in size and shape to the flow passages 120 in the stator 102. Altenatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one preferred embodiment, the tool housing 101 has pressure sensors, not shown, mounted in locations above and below the pulser assembly, with the sensing surface exposed to the fluid in the drill string bore. These sensors are powered by the electonics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In a preferred embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In a preferred embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3A:
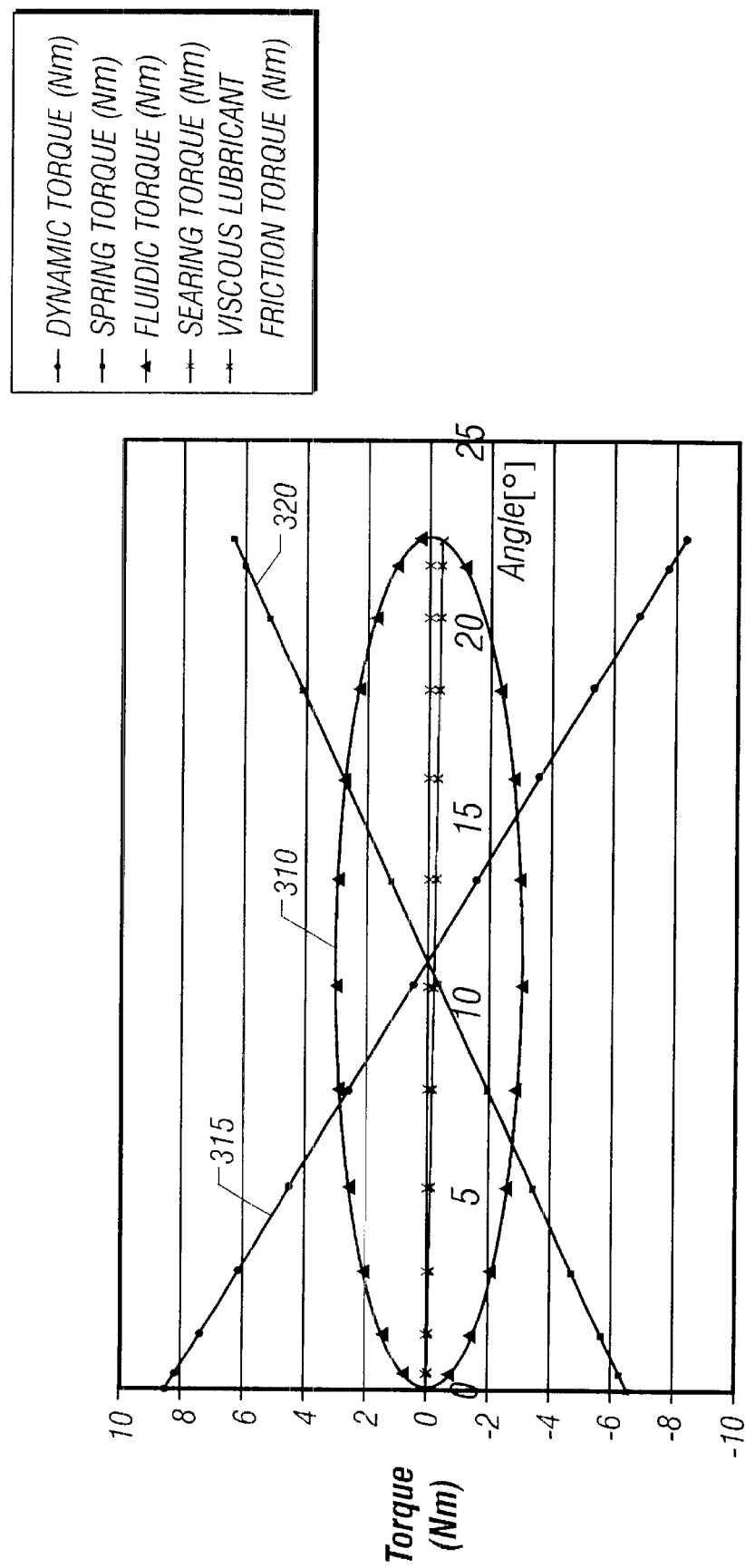
FIG. 3a is a schematic of a typical torque signature acting on an oscillating shear valve according to one embodiment of the present invention.

FIG. 3*a* shows a typical torque signature acting on an oscillating shear valve. The torque acting on the rotating disc is subdivided into three main parts, the torque due to the fluid force 310, the dynamic torque caused by the inertia and acceleration 315, and the counterbalancing spring torque 320 (example is taken for 40 Hz). If the dynamic torque 315 and the spring torque 320 are added, the spring torque 320 will cancel out most of the dynamic torque 315 and essentially only the fluidic torque 310 remains.

In an alternative preferred embodiment, the spring used in the spring-mass system is a magnetic spring assembly 300, as shown in FIG. 3*b*. The magnetic spring assembly 300 comprises an inner magnet carrier 303 being rigidly coupled to the shaft 106, inner magnets 301 fixed to the inner magnet carrier 303, and an outer magnet carrier 304, carrying the outer magnets 302. The outer magnet carrier 304 is mounted to the pulser housing 108. The outer magnet carrier 304 is adapted to be moved in the axial direction with respect to the tool axes, while remaining in a constant angular position with respect to the pulser housing 108. The magnetic spring assembly 300 creates a magnetic torque when the inner magnet carrier 303 is rotated with respect to the outer magnet carrier 304. Using an appropriate number of poles (number of magnet pairs) it is possible to create a magnetic spring torque which counterbalances the dynamic torques of the rotor 103, the shaft 106, the bearings 108, the inner magnet carrier 303, and the motor 104. With axial displacement of the outer magnet carrier 304 with respect to the inner magnet carrier 303, the magnetic spring rate and, therefore, the spring-mass natural frequency can be adjusted such that this spring-mass system is at its natural frequency at, or near, the desired oscillating pulse frequency of the pulser.

The above described rotor drive system provides precise control of the angular position of the rotor 103 with respect to the position of the stator 102. Such precise control allows the improved use of several encoding schemes common to the art of mud pulse telemetry.

In contrast to an axial reciprocating flow restrictor, the torque to drive a flow shear valve is not as dependent on the pressure drop being created. Hence the power to drive a shear valve at the same frequency and the same pressure drop is lower. Commonly used rotational shear valves that rotate at a constant speed consume relatively low power when operating at a constant frequency. A high power peak is required when those devices switch from one frequency to a second frequency, for example in an FSK system. With the oscillating spring mass system, the encoding or switching between phase/frequency/amplitude does not require a high actuation power, because the speed is always zero when the valve is fully closed or open. Starting from the zero speed level a phase/frequency/amplitude change does not substantially affect the overall power consumption. In a preferred embodiment of the shear valve, the main power is used to drive the system at a high frequency level. Once it is capable of creating a high frequency it can switch to another one almost immediately. This quick change gives a very high degree of freedom for encoding of telemetry data. The characteristic used for the encoding (frequency, phase or amplitude change) can be switched from one state to a second state, thereby transmitting information, within one period or less. No transition zone is needed between the different levels of encoded information. Hence there will be more information content per time frame in the pressure pulse signal of the oscillating shear valve than with a conventional shear valve system.

In another embodiment, the encoding characteristic change is initiated at any rotor position, with the new state of phase, frequency, or amplitude still achieved within one oscillating period.

Figure 4:
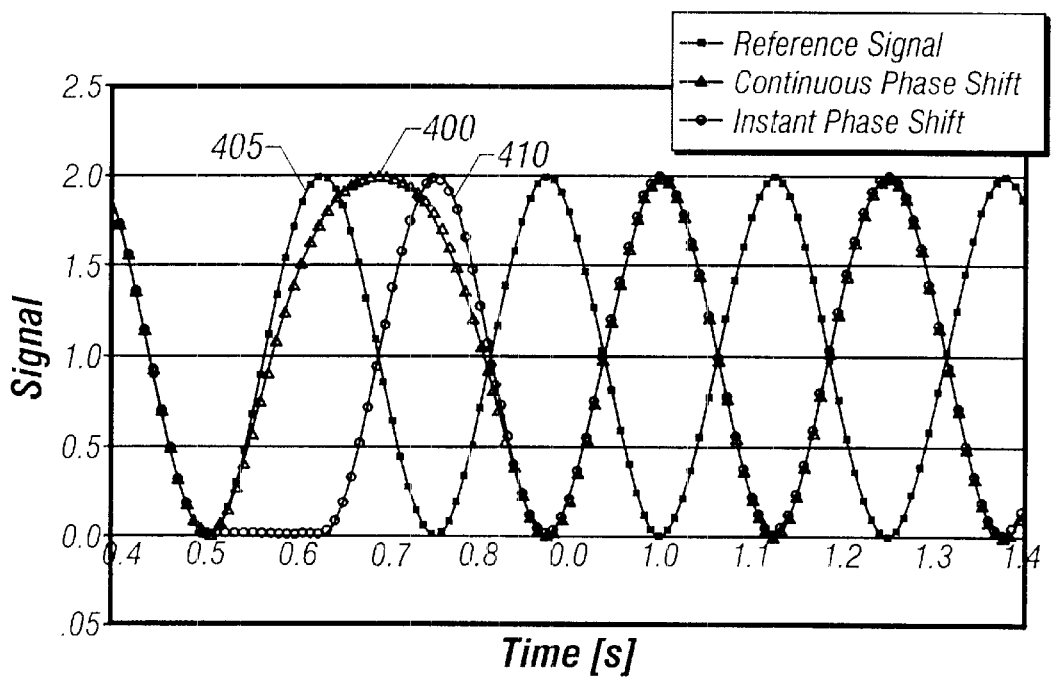
FIG. 4 is schematic which describes Phase Shift Key encoding using an oscillating shear valve according to one embodiment of the present invention.

FIG. 4 displays a graph which shows Phase Shift Key encoding of the oscillating shear valve as compared to a continuously rotating shear valve. The continuous phase shift signal 400 requires 1½ signal periods of the reference signal 405 to achieve a full 180° phase shift. In the transition time between 0.5 s and 0.9 s the information of the continuous phase shift signal 400 can not be used because it contains multiple frequencies. With the oscillating shear valve, the DC motor allows the rotor to be started at essentially any time thereby effectively providing an essentially instant phase shift. As shown in FIG. 4, the oscillating shear valve phase shift signal 410 starts at 0,5 s already in the proper phase shifted relationship with the reference signal 400 such that the following signal period can already be used for encoding purposes. Thus, there is more information per time frame with a phase shift keying signal generated with an angular oscillating shear valve than with a continuously rotating shear valve.

Figure 5:
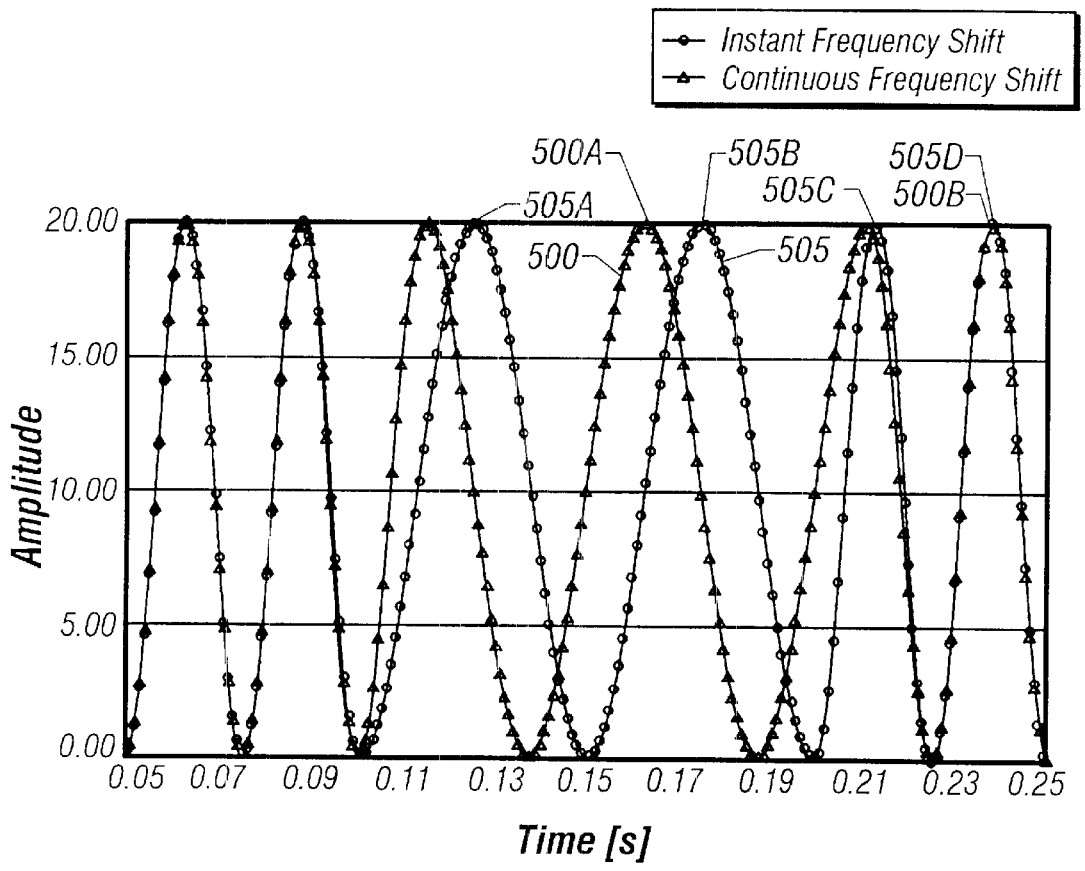
FIG. 5 is a schematic which describes Frequency Shift Key encoding using an oscillating shear valve according to one embodiment of the present invention.

FIG. 5 displays a graph showing a Frequency Shift Keying signal of the angular oscillating shear valve compared to a signal of a continuously rotating shear valves using the same encoding scheme. This example shows a frequency shift from 40 Hz to 20 Hz and back to 40 Hz. At 0.10 s the frequency is shifted from 40 Hz to 20 Hz, with the signal 500 from the continuously rotating shear valve, shifting only one full amplitude 500*a* of the low frequency at 0,16 s before it must shift back to the high frequency signal at 500*b*. Only the peaks at 500*a* and 500*b* are suitable for encoding information. The transition periods before and after the frequency shift contain multiple frequencies which can not be used for coding purposes. With the signal 505 from the angular oscillating shear valve, there are still two fully usable amplitudes 505*a* and 505*b* at the lower frequency and two usable peaks at the higher frequency 505*c* and 505*d*. As with phase shift keying, there is more information content per time frame with the angular oscillating shear valve than with a continuously rotating shear valve. This can provide higher detection reliability by providing more cycles to lock onto, or alternatively the frequency changes can be more rapid, thereby increasing the data rate, or a combination of these.

An Amplitude Shift Key (ASK) signal can be easily generated with the oscillating shear valve of the present invention. The signal amplitude is proportional to the amount of flow restriction and thus is proportional to the amount of angular rotation of the rotor 103. The rotor rotation angle can be continuously controlled and, therefore, the amplitude of each cycle can be different as the motor 104 can accurately rotate the rotor 103 through a different angular rotation on each cycle according to programmed control from the electronics module 135.

Figure 7:
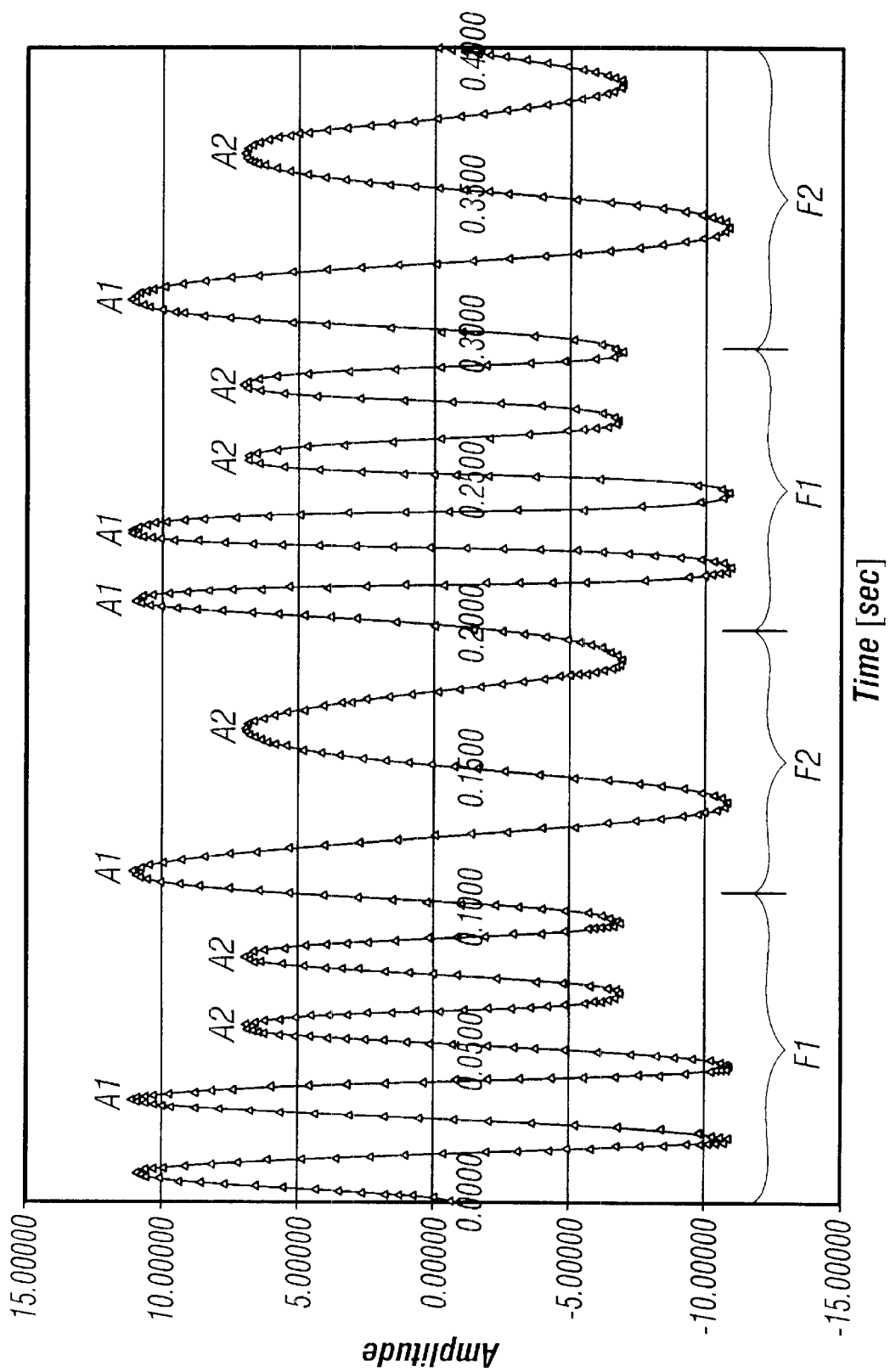
FIG. 7 is a schematic which describes a combination of a Frequency Shift Key and an Amplitude Shift Key encoding using an oscillating shear valve according to one embodiment of the present invention.

In addition, because the rotor can be continuously and accurately controlled, combinations of ASK and FSK or ASK and PSK may be used to encode and transmit multiple signals at the same time, greatly increasing the effective data rate. FIG. 7 is a schematic showing one scheme for combining an ASK and an FSK encoded signal. Both signals are carried out in a constant phase relationship with an amplitude shift from A1 to A2 or from A2 to A1 representing data bits of a first encoded signal and the frequency shifts from F1 to F2 or from F2 to F1 representing data bits of a second encoded signal. This type of signal is generated by changing both the oscillating frequency of the rotor and simultaneously changing the rotor oscillation angle, as previously described.

Similarly, a signal combining ASK and PSK encoding (not shown) can be generated by changing the phase relationship of a constant frequency signal while simultaneously changing the amplitude by changing the rotor oscillation angle. Here, the amplitude shifts represent a first encoded signal and the phase shifts represent a second encoded signal.

One problem for rotating valves used in a drill string is plugging the valve during operation, for example, with either lost circulation materials or foreign bodies in the flow stream. FIGS. 6a–6d illustrates the anti-plugging feature of the angular oscillating shear valve as contrasted to a continuously rotating shear valve. FIGS. 6a and 6b show a continuously rotating shear valve and an oscillating shear valve, respectively. A rotor 603 rotates below a stator 602. Rotor 603 and stator 602 have a plurality of openings 607 and 606, respectively serving as a flow channels. Because of the rotor rotation, the flow channel is open when the flow channels 606 and 607 are aligned and the flow channel is closed when the both flow channels 606 and 607 are not aligned. A continuously rotating shear valve opens and closes the flow passage only in one rotational direction as seen in FIG. 6a. An angular oscillating valve opens and closes the flow passage by alternating the rotational direction as illustrated in FIG. 6b. A foreign body 605 enters and traverses a flow passage in both the stator 602 and the rotor 603. FIG. 6c demonstrates that the continuously rotating shear valve jams the foreign body between the rotor 603 and the stator 602, and fails to continue to rotate, possibly requiring the downhole tool to be retrieved to the surface for maintenance. However, an oscillating shear valve, as illustrated in FIG. 6d, opens the valve again in the opposite direction during its standard operation. The flow channel recovers to its full cross section area and the foreign body 605 is freed, and the valve continues to operate The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A mud pulse telemetry system, comprising:
   a. a drillstring having a drilling fluid flowing therein, said drill string extending in a borehole from a drilling rig to a downhole location;
   b. a tool housing disposed in the drill string, the tool housing adapted to support a pulser assembly;
   c. a rotationally oscillating pulser assembly; and,
   d. an electronics module for controlling the pulser assembly.

2. The mud pulse telemetry system of claim 1, wherein the rotationally oscillating pulser assembly, comprises;
   i. a non-rotating stator disposed in the flowing drilling fluid, said stator having a plurality of flow passages to channel the drilling fluid;
   ii. a rotor disposed in the flowing drilling fluid proximate the stator, the rotor having a plurality of flow passages;
   iii. a drive motor adapted to drive the rotor in a rotationally oscillating manner for generating pressure fluctuations in the drilling fluid; and
   iv. an oil filled pulser housing having a fluid seal for preventing intrusion of wellbore fluid.

3. The mud pulse telemetry system of claim 2, wherein, the fluid seal comprises a flexible elastomeric bellows.

4. The mud pulse telemetry system of claim 2 wherein the tool housing is further adapted to house at least one upper pressure sensor proximate an upper housing end and at least one lower pressure sensor proximate a lower housing end.

5. The mud pulse telemetry system of claim 2 wherein the electronics module comprises circuitry to control the motion of the motor, said circuitry including a programmable processor adapted to perform programmed instructions for controlling the motion of the motor.

6. The mud pulse telemetry system of claim 4 wherein the electronics module comprises circuitry to power and read the at least one upper pressure sensor and the at least one lower pressure sensor, said circuitry including a programmable processor adapted to perform programmed instructions for controlling the motion of the motor, said processor further adapted to read pressure signals from the at least one upper pressure sensor and the at least one lower pressure sensor, said processor modifying the motor motion, according to programmed instructions, so as to maintain a predetermined pressure differential between the at least one upper pressure sensor and the at least one lower pressure sensor.

7. The mud pulse telemetry system of claim 6 wherein the programmable processor is adapted, according to programmed instructions, to detect and decode a command pressure pulse signal sent from a surface location, said processor thereby modifying the motion of the motor, according to programmed instructions.

8. The mud pulse telemetry system of claim 2, wherein the drive motor is one of (i) a reversible D.C. motor and (ii) a stepper motor.

9. A mud pulse telemetry system, comprising:
   a. a drillstring having a drilling fluid flowing therein, said drill string extending in a borehole from a drilling rig to a downhole location;
   b. a pulser disposed in said drillstring, said pulser comprising:
      i. a non-rotating stator;
      ii. a rotor proximate said stator;
      iii. a drive motor adapted to drive the rotor in a controllable rotationally oscillating manner for generating pressure fluctuations in the drilling fluid, said drive motor controlling at least one oscillating characteristic of interest of the rotor; and
   c. an electronics module for controlling the drive motor motion.

10. The mud pulse telemetry system of claim 9, wherein the at least one oscillating characteristic of interest of the rotor is at least one of (i) oscillating frequency of the rotor; (ii) oscillating angle of the rotor; and (iii) oscillating phase of the rotor.

11. The mud pulse telemetry system of claim 9, further comprising a torsion spring acting cooperatively with the drive motor to reduce power required to drive said rotor in said controlled rotationally oscillating manner.

12. The mud pulse telemetry system of claim 11, wherein the torsion spring comprises a solid rod.

13. The mud pulse telemetry system of claim 11, wherein the torsion spring comprises:
 a. an outer magnet carrier adapted to be rotationally anchored to the pulser housing and adapted to move axially within the pulser housing, said outer magnet carrier having a plurality of permanent bar magnets mounted spaced around an inner diameter of the outer magnet carrier, said magnets mounted with alternating magnetic poles normal to the inner diameter of the outer magnet carrier, and,
 b. an inner magnet carrier to attach to an end of a motor drive shaft distal from the rotor; said inner magnet carrier having a plurality of permanent bar magnets mounted correspondingly spaced around an outer diameter of the inner magnet carrier, said magnets mounted with alternating magnetic poles normal to the outer diameter of the inner magnet carrier.

14. The mud pulse telemetry system of claim 11, wherein the torsion spring has a predetermined spring constant such that the torsion spring acts cooperatively with a plurality of rotating masses comprising the drive motor and the rotor to create a torsional spring-mass system whose torsional resonant frequency is related to a predetermined pressure fluctuation frequency.

15. The mud pulse telemetry system of claim 9, further comprising a tool housing disposed in said drillstring for supporting said pulser in said drillstring.

16. The mud pulse telemetry system of claim 9, further comprising an oil filled pulser housing having a fluid seal for preventing intrusion of wellbore fluid.

17. The mud pulse telemetry system of claim 16, wherein, the fluid seal comprises a flexible elastomeric bellows.

18. The mud pulse telemetry system of claim 15 wherein the tool housing is further adapted to house at least one upper pressure sensor proximate an upper housing end and at least one lower pressure sensor proximate a lower housing end.

19. The mud pulse telemetry system of claim 9, wherein the electronics module comprises circuitry to control the motion of the motor, said circuitry including a programmable processor adapted to perform programmed instructions for controlling the motion of the motor.

20. The mud pulse telemetry system of claim 18 wherein the electronics module comprises circuitry to power and read the at least one upper pressure sensor and the at least one lower pressure sensor, said circuitry including a programmable processor adapted to perform programmed instructions for controlling the motion of the motor, said processor further adapted to read pressure signals from the at least one upper pressure sensor and the at least one lower pressure sensor, said processor modifying the motor motion, according to programmed instructions, so as to maintain a predetermined pressure differential between the at least one upper pressure sensor and the at least one lower pressure sensor.

21. The mud pulse telemetry system of claim 20 wherein the programmable processor is adapted, according to programmed instructions, to detect and decode a command pressure pulse signal sent from a surface location, said processor modifying the motion of the motor in response thereto, according to programmed instructions.

22. The mud pulse telemetry system of claim 9, wherein the drive motor is one of (i) a reversible D.C. motor and (ii) a stepper motor.

* * * * *